Figure 1:
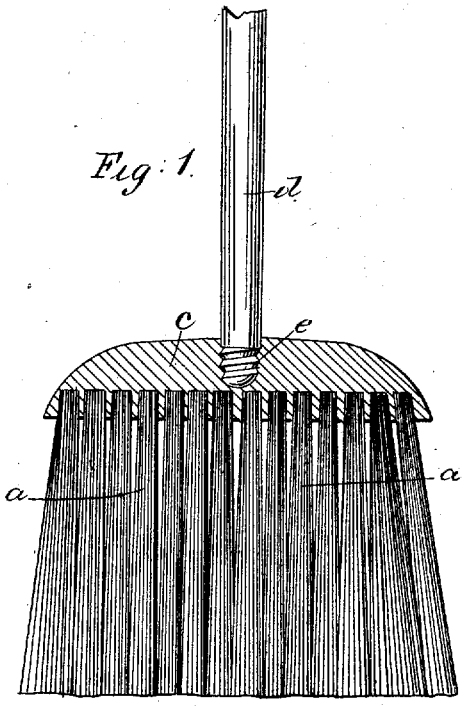

C. L. W. BAKER.

Broom.

No. 2,059. Reissued Aug. 29, 1865.

Witnesses:
E. Horton jr.
Jerry W. Bliss

Inventor
Chas. L. W. Baker.

N. PETERS, Photo-Lithographer, Washington, D. C.

UNITED STATES PATENT OFFICE.

C. L. W. BAKER, OF HARTFORD, CONNECTICUT.

BROOM.

Specification forming part of Letters Patent No. 32,504, dated June 11, 1861; Reissue No. 2,059, dated August 29, 1865.

*To all whom it may concern:*

Be it known that I, C. L. W. BAKER, of the city and county of Hartford, and State of Connecticut, have invented certain new and useful Improvements in the Manufacture of Corn Brooms; and I do hereby declare that the same is described and represented in the following specification and drawings; and to enable others skilled in the art to make and use the same, I will proceed to describe its construction by referring to the drawings, in which the same letters indicate like parts in each of the figures.

The natu e of this improvement in corn brooms consists in securing the brush in separate tufts into a wood head by the use of any suitable material, and in securing the handle into the head by a screw, or other means whereby it shall be detachable at will for transportation, &c., the object of which is to produce a broom equally useful and durable, made of less brush, by less labor, presenting a broad, flexible brush to the surface upon which it is to used, and to render it more convenient for transportation, because of the great saving of room in storing.

Figure 2:
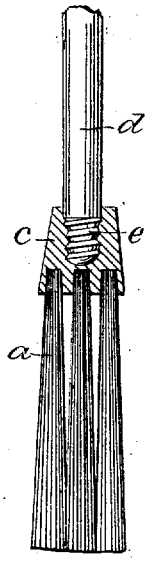

In the accompanying drawings, Figure 1 is a sectional side elevation, and Fig. 2 is a sectional end elevation, of my improvement in the manufacture of corn brooms.

*a* are tufts of corn brush.

*c* is the head of the broom, made of wood or other suitable material, having apertures into which the tufts of corn brush are secured by adhesive substance, or other suitable means or material.

*d* is the handle of the broom, made slightly tapering, or having a screw cut or secured on one end thereof, thereby affording facility for quickly securing it to the head of the broom, or to remove it therefrom. Said head is also provided with a slightly-tapering hole, or with a screw-thread to correspond with the provision of the end of its handle, by which means the handle is quickly secured to the head of the broom or removed therefrom.

By securing the tufts of corn brush into the head at proper distance apart, the flexibility of the broom will continue until it is worn nearly up to the wood head, which can not be the case in the common tie-broom.

In such cases as when the brush is long, I propose to tie once or twice, so as to stiffen the broom until it is considerably worn, then cut the threads and allow the brush free elasticity. Besides, when the common tie-broom is worn up and thrown aside as useless, the same brush, thus lost, if made up in this way, would do as much service (nearly) as the first use of the tie-broom. For the purpose of transportation they can be packed in much less space than the tie-broom, and one handle will be sufficient for an indefinite number of brooms. Thus, the broom, with its handle, may be detached and packed away in a chest or trunk, when desirable. In short, it is cheaper of manufacture, a better and more useful article, and every way better calculated to please the housekeeper.

I believe I have thus shown the nature, construction, and advantage derived by this improvement over others now in use, so as to enable a person skilled to make and use the the same.

What I claim, therefore, and desire to secure by Letters Patent, is—

An improved article of manufacture, consisting of a broom, being composed of the fiber of broom-corn set in tufts in a block of wood, substantially in the manner as and for the purpose described.

In testimony whereof I have hereunto set my hand and seal this 3d day of August, 1865.

CHS. L. W. BAKER. [L. S.]

Witnesses:

E. HORTON,

JEREMY W. BLISS.